(12) United States Patent
Kim et al.

(10) Patent No.: US 11,922,433 B2
(45) Date of Patent: Mar. 5, 2024

(54) BICYCLE APPLICATION SERVICE PLATFORM SERVER, METHOD, AND COMPUTER-READABLE RECORDING MEDIUM BASED ON REDUCED CARBON EMISSION CALCULATION

(71) Applicant: Wrightbrothers Co.,Ltd, Seoul (KR)

(72) Inventors: Hee Soo Kim, Seoul (KR); Now Kim, Seoul (KR)

(73) Assignee: Wrightbrothers Co., Ltd, Seoul (KR)

( * ) Notice: Subject to any disclaimer, the term of this patent is extended or adjusted under 35 U.S.C. 154(b) by 0 days.

(21) Appl. No.: 17/954,572

(22) Filed: Sep. 28, 2022

(65) Prior Publication Data

US 2023/0101390 A1      Mar. 30, 2023

(30) Foreign Application Priority Data

Sep. 28, 2021   (KR) .......................... 10-2021-0127643

(51) Int. Cl.
  *G06Q 30/018*    (2023.01)
  *G06T 7/00*    (2017.01)
(52) U.S. Cl.
  CPC .......... *G06Q 30/018* (2013.01); *G06T 7/0004* (2013.01); *G06T 2207/30164* (2013.01)
(58) Field of Classification Search
  None
  See application file for complete search history.

(56) References Cited

U.S. PATENT DOCUMENTS

| | | | |
|---|---|---|---|
| 10,360,601 B1 | 7/2019 | Adegan | |
| 11,776,135 B2* | 10/2023 | Karasev | .............. G06V 10/764 |
| 2012/0116911 A1* | 5/2012 | Irving | ................ G06Q 30/0611 |
| | | | 705/26.4 |

(Continued)

FOREIGN PATENT DOCUMENTS

| KR | 10-2010-0051179 A | 5/2010 |
|---|---|---|
| KR | 10-2009-0089532 B1 | 6/2010 |

(Continued)

OTHER PUBLICATIONS

Sparks, Daniel T. "Combining sustainable value stream mapping and simulation to assess manufacturing supply chain network performance." (2014). (Year: 2014).*

(Continued)

*Primary Examiner* — Sara Grace Brown
(74) *Attorney, Agent, or Firm* — Bridgeway IP Law Group, PLLC; Jihun Kim (57) ABSTRACT

A platform server includes at least one memory configured to store instructions for performing a predetermined operation, and at least one processor operatively connected to the memory and configured to execute the instructions. The at least one processor is configured to store data in which carbon emissions are defined for each manufacturing weight of bicycle parts made of a predetermined material, acquire an image of a bicycle, determine parts included in the image, determine carbon emissions according to manufacturing of the bicycle by comparing information on the determined parts with the defined data, and provide mileage to a subject related to an event based on the determined carbon emissions when the event related to the bicycle corresponding to the image occurs.

16 Claims, 6 Drawing Sheets

(56) References Cited

U.S. PATENT DOCUMENTS

| | | | | |
|---|---|---|---|---|
| 2018/0204258 | A1* | 7/2018 | Kim | G06Q 10/087 |
| 2018/0276679 | A1* | 9/2018 | Fang | G06Q 10/08 |
| 2019/0019045 | A1* | 1/2019 | Ogura | G06V 10/44 |
| 2020/0074178 | A1* | 3/2020 | Guo | G06V 20/00 |
| 2022/0067751 | A1* | 3/2022 | Sanchez | G06F 16/9535 |
| 2022/0108395 | A1* | 4/2022 | Xie | G06Q 40/06 |
| 2022/0214668 | A1* | 7/2022 | King | G06F 30/20 |
| 2022/0237628 | A1* | 7/2022 | Wollack | H04L 9/50 |
| 2022/0335441 | A1* | 10/2022 | Wahba | G06Q 30/0627 |

FOREIGN PATENT DOCUMENTS

| | | |
|---|---|---|
| KR | 10-2013-0044079 A | 5/2013 |
| KR | 10-2018-0007230 B1 | 6/2018 |
| KR | 10-1869895 B1 | 6/2018 |

OTHER PUBLICATIONS

Chu, C. H., J. C. P. Su, and Y. T. Chen. "An Integrated Approach to Sustainable Product Development at the System Design Stage." (2011). (Year: 2011).*

Roy, Papon, Md Danesh Miah, and Md Tasneem Zafar. "Environmental impacts of bicycle production in Bangladesh: a cradle-to-grave life cycle assessment approach." SN Applied Sciences 1 (2019): 1-16. (Year: 2019).*

Regenwetter, Lyle, Brent Curry, and Faez Ahmed. "BIKED: A Dataset for Computational Bicycle Design with Machine Learning Benchmarks." (Aug. 17, 2021). (Year: 2021).*

Rutherford, Jay William. Source Apportionment of Combustion Generated Particulate Matter Air Pollution using Excitation Emission Matrix Fluorescence Spectroscopy and Machine Learning. Diss. 2019. (Year: 2019).*

Chen, Jingrui, et al. "Life cycle carbon dioxide emissions of bike sharing in China: Production, operation, and recycling." Resources, Conservation and Recycling 162 (2020): 105011. (Year: 2020).*

Qiao, Qinyu, et al. "Cradle-to-gate greenhouse gas emissions of battery electric and internal combustion engine vehicles in China." Applied energy 204 (2017): 1399-1411. (Year: 2017).*

Bonilla-Alicea, Ricardo Javier, et al. "Life cycle assessment to quantify the impact of technology improvements in bike-sharing systems." Feb. 2020. Journal of Industrial Ecology 24.1 (2020): 138-148. (Year: 2020).*

Office Action dated Mar. 17, 2022, in corresponding to Korean Patent Application No. 10-2022-0013940, 5 pages.

Notice of Allowance dated Jun. 10, 2022, in corresponding to Korean Patent Application No. 10-2022-0013940, 2 bages.

Office Action dated Oct. 19, 2021, in corresponding to Korean Patent Application No. 10-2021-0127643, 11 pages (with English Translation).

Notice of Allowance dated Dec. 28, 2021, in corresponding to Korean Patent Application No. 10-2021-0127643, 4 bages (with English Translation).

Yoo-Kyung, "Do bicycles also emit carbon? Carbon reduction calculator for second-hand trading", Money Today, Sep. 3, 2021, https://news.mt.co.kr/mtview.php?no=2021090310481749159&type=.

Office Action dated Oct. 29, 2021, in corresponding to Korean Patent Application No. 10-2021-0127643; 9 pages (with English Translation).

Notice of Allowance dated Dec. 28, 2021, in corresponding Korean Patent Application No. 10-2021-0127643; 4 bages (with English Translation).

Bernardo Reino, "Extended European Search Report in European Application No. 22198094.9", dated Jan. 30, 2023, EPO, Germany.

* cited by examiner

|  |  | WEIGHTS (kg) | CARBON EMISSIONS (kgCO2e per kg) |
|---|---|---|---|
| MATERIALS OF PARTS | Titanium 3AL-2.5V Alloy | 1 | 8.69 |
| COMPONENT RATIOS (wt%) | Titanium (Ti) | 93.555 |  |
|  | Aluminum (Al) | 3.5 |  |
|  | Vanadium (V) | 2.5 |  |
|  | Iron (Fe) | 0.2 |  |
|  | Oxygen (O) | 0.15 |  |
|  | Carbon (C) | 0.05 |  |
|  | Nitrogen (N) | 0.03 |  |
|  | Hydrogen (H) | 0.015 |  |

FIG.2B

|  |  | WEIGHTS (kg) | CARBON EMISSIONS (kgCO2e per kg) |
|---|---|---|---|
| MATERIALS OF PARTS | Titanium 6AL-4V Alloy | 1 | 9.1 |
| COMPONENT RATIOS (wt%) | Titanium (Ti) | 90 |  |
|  | Aluminum (Al) | 6 |  |
|  | Vanadium (V) | 4 |  |
|  | Carbon (C) | 0.1 |  |
|  | Oxygen (O) | 0.2 |  |
|  | Nitrogen (N) | 0.05 |  |
|  | Hydrogen (H) | 0.0125 |  |
|  | Iron (Fe) | 0.3 |  |

FIG.2C

| | | WEIGHTS (kg) | CARBON EMISSIONS (kgCO2e per kg) |
|---|---|---|---|
| MATERIALS OF PARTS | 6061 aluminium alloy | 1 | 7.99 |
| COMPONENT RATIOS (wt%) | Aluminum (Al) | 95.9 | |
| | Magenesium (Mg) | 1.2 | |
| | Silicon (Si) | 0.8 | |
| | Iron (Fe) | 0.7 | |
| | Copper (Cu) | 0.4 | |
| | Chromium (Cr) | 0.35 | |
| | Zinc (Zn) | 0.25 | |
| | Titanium (Ti) | 0.25 | |
| | Manganese (Mn) | 0.15 | |

FIG.2D

| | | WEIGHTS (kg) | CARBON EMISSIONS (kgCO2e per kg) |
|---|---|---|---|
| MATERIALS OF PARTS | 7005 aluminium alloy | 1 | 7.76 |
| COMPONENT RATIOS (wt%) | Aluminum (Al) | 91.19 | |
| | Chromium (Cr) | 0.2 | |
| | Copper (Cu) | 0.1 | |
| | Iron (Fe) | 0.4 | |
| | Magenesium (Mg) | 1.8 | |
| | Manganese (Mn) | 0.7 | |
| | Silicon (Si) | 0.35 | |
| | Titanium (Ti) | 0.06 | |
| | Zinc (Zn) | 5 | |
| | Zirconium (Zr) | 0.2 | |

BICYCLE APPLICATION SERVICE PLATFORM SERVER, METHOD, AND COMPUTER-READABLE RECORDING MEDIUM BASED ON REDUCED CARBON EMISSION CALCULATION

CROSS-REFERENCE TO RELATED APPLICATION

This application claims priority to Korean Patent Application No. 10-2021-0127643, filed on Sep. 28, 2021. The entire contents of the application on which the priority is based are incorporated herein by reference.

TECHNICAL FIELD

An embodiment of the present disclosure relates to a technology that provides incentives to entities involved in carbon emission reduction based on the reduced carbon emission by providing various application services related to bicycles.

BACKGROUND

Currently, many countries around the world are trying to phase out carbon emissions after the enactment of the Kyoto Protocol. The member countries or companies of the Kyoto Protocol set limits on carbon emissions by period, and for excess emissions, they are obliged to buy and sell carbon credits.

Accordingly, in order to reduce carbon emissions, many countries are encouraged to use bicycles by constructing various infrastructures such as bicycle-only roads, bicycle landscape roads, and bicycle express roads. Furthermore, efforts are underway to reduce carbon emissions by providing incentives for using bicycles.

SUMMARY

In order to stably operate the carbon emission cap system and to encourage many people to reduce carbon emissions, a measure is needed to accurately calculate the amount of carbon emission and reduction according to a carbon emission source, and to give fair incentives to those involved in carbon emission reduction.

As a measure to reduce carbon emissions, in addition to a measure to activate bicycles as an active means of transportation, by actively activating the used transaction of bicycles that have been made but are underutilized, while more people use bicycles, it is possible to draw up measures to reduce carbon additionally generated by bicycle manufacturing or disposal of bicycles.

Accordingly, embodiments of the present disclosure are directed to providing bicycle users with various application services that can reduce carbon emissions, and to providing a technology that objectively calculates carbon emissions reduced by the occurrence of events related to application services The aspects of the present disclosure are not limited to those mentioned above, and other aspects not mentioned herein will be clearly understood by those skilled in the art from the following description.

In accordance with an aspect of the present disclosure, there is provided platform server, the server comprising: at least one memory configured to store instructions for performing a predetermined operation; and at least one processor operatively connected to the memory and configured to execute the instructions, wherein the at least one processor is configured to: store data in which carbon emissions are defined for each manufacturing weight of bicycle parts made of a predetermined material; acquire an image of a bicycle; determine parts included in the image; determine carbon emissions according to manufacturing of the bicycle by comparing information on the determined parts with the defined data; and provide mileage to a subject related to an event based on the determined carbon emissions when the event related to the bicycle corresponding to the image occurs.

The at least one processor is configured to determine a material and weight of the determined parts.

The at least one processor is configured to calculate the carbon emissions during manufacturing of the parts by multiplying a carbon emission for each manufacturing weight corresponding to the material of the determined parts with a weight of the determined parts according to the defined data; and determine the carbon emissions according to manufacturing of the bicycle by summing the carbon emissions calculated for all parts determined from the image.

The at least one processor is configured to determine 3 Zone parts configuring a frame, a wheel, and a drive system among the bicycle parts; calculate carbon emissions during manufacturing of the 3 Zone parts by multiplying a carbon emission for each manufacturing weight corresponding to the material of the determined 3 Zone parts with a weight of the determined 3 Zone parts according to the defined data; calculate carbon emissions of other parts based on an average of carbon emissions emitted by other parts configuring other bicycles completed with the 3 Zone parts; and determine the carbon emissions according to manufacturing of the bicycle by summing the carbon emissions during manufacturing of the 3 Zone parts and the carbon emissions of the other parts.

The at least one processor is configured to specify the bicycle parts by inputting the image into a neural network model learned based on an image data set for each bicycle part to which specification information for each part of the bicycle is mapped, wherein the specification information for each part comprises information on a material and weight of the part.

The at east one processor is configured to disclose information on a used transaction of the bicycle corresponding to the image to a used trading platform; and provide mileage based on the carbon emissions to a subject involved in the used transaction of the bicycle by mediating the used transaction.

The subject involved in the used transaction comprises an owner of the bicycle corresponding to the image and a purchaser who purchases the bicycle from the owner.

The at least one processor is configured to an operation of acquiring a distance moved by an owner of the bicycle corresponding to the image using the bicycle, and providing mileage proportional to the moved distance to the owner.

The at least one processor is configured to acquire a distance moved by an owner of the bicycle corresponding to the image using the bicycle, and provide the owner with mileage proportional to carbon emissions according to the distance moved using the other means of transportation when the moved distance corresponds to a distance that replaces other means of transportation.

The mileage proportional to the moved distance is proportional to a value obtained by multiplying the moved distance with carbon emissions for each moving distance when the other means of transportation is used.

The at least one processor is configured to determine a type of a means of transportation replaced by the owner based on a range of the distance moved using the bicycle; and determine the carbon emissions by multiplying a carbon emission in units of a distance moved by the determined type of the means of transportation with the moved distance.

The at least one processor is configured to mediate a used transaction of the bicycle corresponding to the image; and generate data that aggregates carbon emissions that have been reduced as a platform provider that mediates the used transaction achieves the used transaction through the platform.

The at least one processor is configured to trade carbon credits based on reduced carbon emissions according to the aggregated data.

In accordance with another aspect of the present disclosure, there is provided a platform providing method performed by a platform server, the method comprises: storing data in which carbon emissions are defined for each manufacturing weight of bicycle parts made of a predetermined material; acquiring an image of a bicycle; determining parts included in the image; determining carbon emissions according to manufacturing of the bicycle by comparing information on the determined parts with the defined data; and providing mileage to a subject related to an event based on the determined carbon emissions when the event related to the bicycle corresponding to the image occurs.

The determining the carbon emissions comprises calculating the carbon emissions during manufacturing of the parts by multiplying a carbon emission for each manufacturing weight corresponding to the material of the determined parts with a weight of the determined parts according to the defined data; and determining the carbon emissions according to manufacturing of the bicycle by summing the carbon emissions calculated for all parts determined from the image.

The determining the parts comprises determining 3 Zone parts configuring a frame, a wheel, and a drive system among the bicycle parts; calculating carbon emissions during manufacturing of the 3 Zone parts by multiplying a carbon emission for each manufacturing weight corresponding to the material of the determined 3 Zone parts with a weight of the determined 3 Zone parts according to the defined data; calculating carbon emissions of other parts based on an average of the carbon emissions emitted by other parts configuring other bicycles completed with the 3 Zone parts; and determining the carbon emissions according to manufacturing of the bicycle by summing the carbon emissions during manufacturing of the 3 Zone parts and the carbon emissions of the other parts.

The determining the parts comprises an operation of specifying the bicycle parts by inputting the image into a neural network model learned based on an image data set for each bicycle part to which specification information for each part of the bicycle is mapped, wherein the specification information for each part comprises information on a material and weight of the part.

The providing the mileage comprises disclosing information on a used transaction of the bicycle corresponding to the image to a used trading platform; and providing mileage based on the carbon emissions to a subject involved in the used transaction of the bicycle by mediating the used transaction.

The providing the mileage comprises acquiring a distance moved by an owner of the bicycle corresponding to the image using the bicycle, and providing mileage proportional to the moved distance to the owner.

In accordance with another aspect of the present disclosure, there is provided a non-transitory computer-readable storage medium including computer executable instructions, wherein the instructions, when executed by a processor, cause the at least one processor to perform the method, the method may comprise: storing data in which carbon emissions are defined for each manufacturing weight of bicycle parts made of a predetermined material; acquiring an image of a bicycle; determining parts included in the image; determining carbon emissions according to manufacturing of the bicycle by comparing information on the determined parts with the defined data; and providing mileage to a subject related to an event based on the determined carbon emissions when the event related to the bicycle corresponding to the image occurs.

According to an embodiment of the present disclosure, by analyzing a bicycle owned by a user, it is possible to calculate the carbon emission required for the manufacture of the bicycle, and to reduce carbon emissions from bicycle manufacturing or disposal by linking various application services that activate the use of the bicycle.

Thus, an embodiment of the present disclosure enables the objective operation of an incentive system according to the reduction of carbon emission that actively responds to government policies and the needs of the times. In addition, the data related to the amount of carbon emission reduction calculated through the embodiment may be utilized for carbon emission trading between individuals, groups, local governments, companies or countries.

The benefits of the present disclosure are not limited to those mentioned above, and other benefits not mentioned herein will be clearly understood by those skilled in the art from the following description.

DETAILED DESCRIPTION OF THE EMBODIMENTS

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, various embodiments of the present disclosure will be described with reference to the accompanying drawings. However, this is not intended to limit the present disclosure to specific embodiments, and it should be understood that various modifications, equivalents and/or substitutes of the embodiments of the present disclosure are included.

Figure 1:
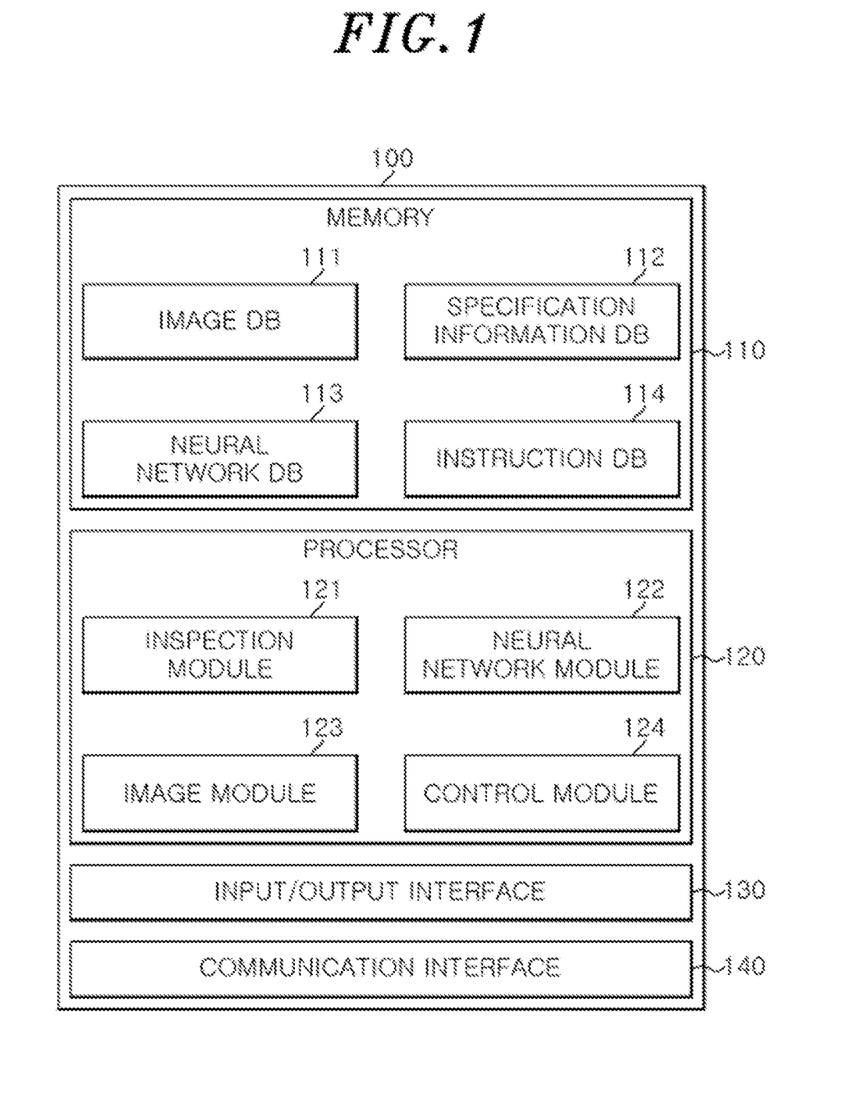
FIG. 1 is a functional block diagram of a platform server according to an embodiment.

FIG. 1 is a functional block diagram of an application service platform server 100 based on reduced carbon emission calculation (hereinafter referred to as "platform server 100") according to an embodiment.

Referring to FIG. 1, the platform server 100 according to an embodiment may include a memory 110, a processor 120, an input/output interface 130, and a communication interface 140.

The memory 110 may include an image DB 111, a specification information DB 112, a neural network DB 113, and an instruction DB 114.

The image DB 111 may store data about an image of a bicycle and an image of parts of a bicycle. The image stored in the image DB 111 may be used for learning a neural network model, which will be described later.

The specification information DB 112 may store data in which carbon emissions are defined for each manufacturing weight of bicycle parts made of a predetermined material.

FIGS. 2A to 2D are exemplary diagrams of data in which carbon emissions are defined for each manufacturing weight of bicycle parts made of a predetermined material according to an embodiment.

Figure 2A:
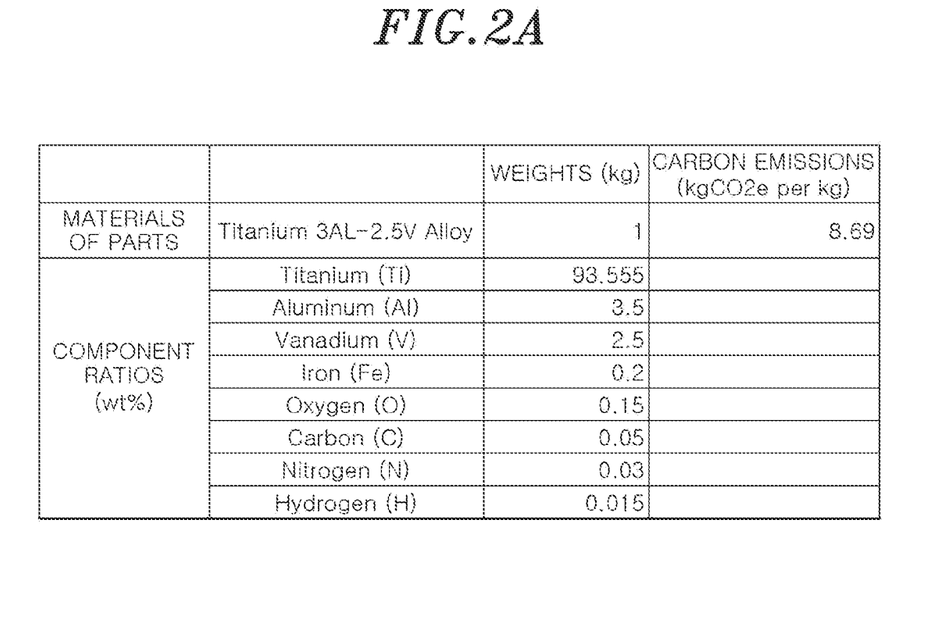
FIG. 2A is an exemplary diagram of data in which carbon emissions are defined for each manufacturing weight of bicycle parts made of a predetermined material according to an embodiment.
Figure 2B:
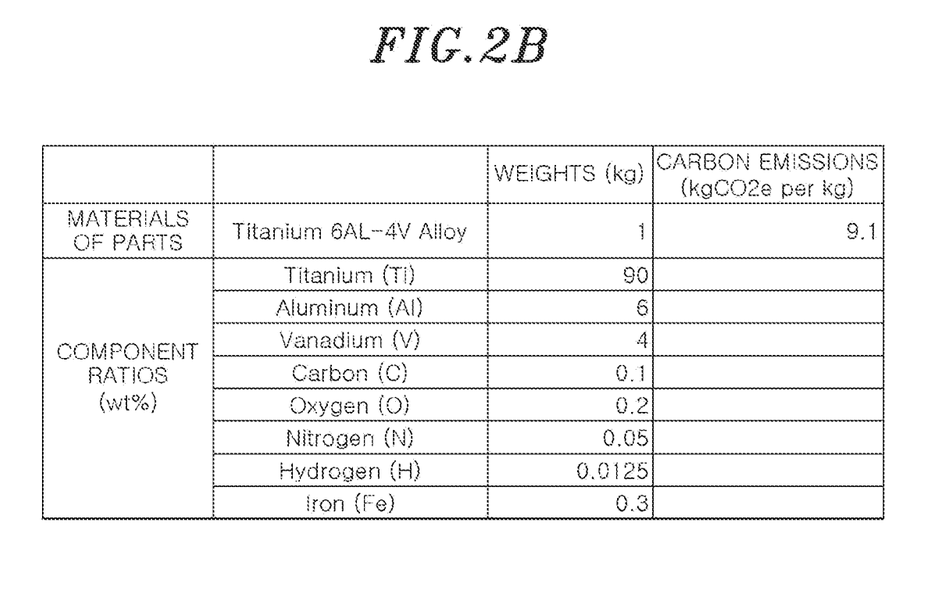
FIG. 2B is an exemplary diagram of data in which carbon emissions are defined for each manufacturing weight of bicycle parts made of a predetermined material according to an embodiment.
Figure 2C:
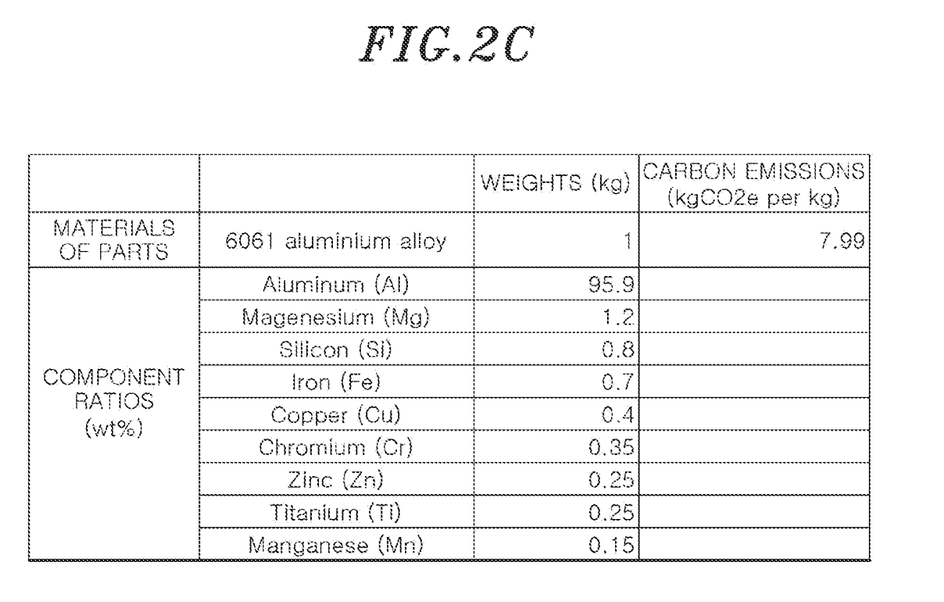
FIG. 2C is an exemplary diagram of data in which carbon emissions are defined for each manufacturing weight of bicycle parts made of a predetermined material according to an embodiment.
Figure 2D:
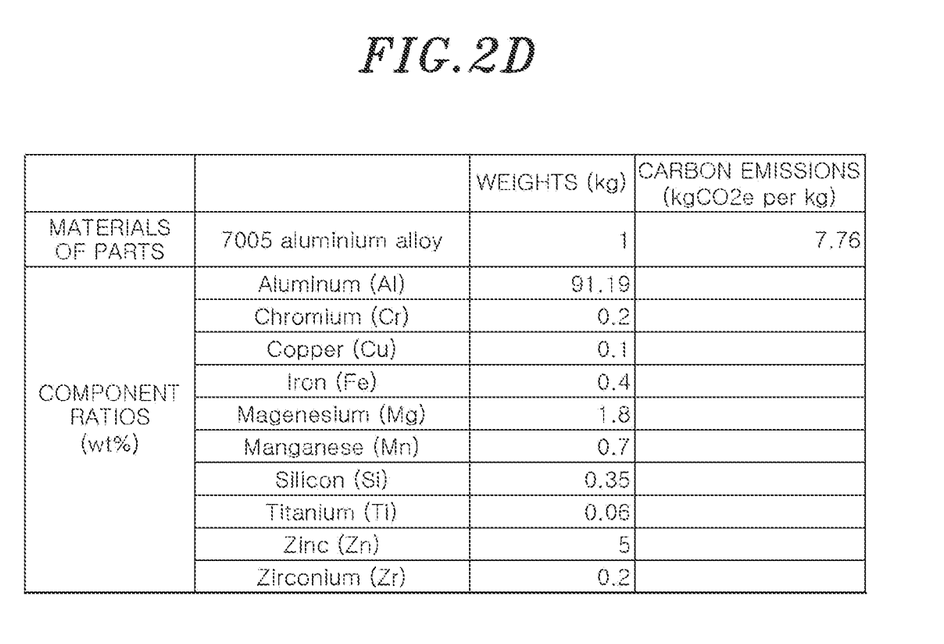
FIG. 2D is an exemplary diagram of data in which carbon emissions are defined for each manufacturing weight of bicycle parts made of a predetermined material according to an embodiment.

Referring to FIGS. 2A to 2D, the data defining carbon emissions may include carbon emissions for each manufacturing weight of materials when the materials configuring the parts of a bicycle (for example, Titanium 3AL-2.5V Alloy, Titanium 6AL-4V Alloy, 6061 aluminum alloy, 7005 aluminum alloy, etc.) are manufactured. For example, FIG. 2A is data defining carbon emissions when bicycle parts are manufactured of Titanium 3AL-2.5V Alloy. In the data defining carbon emissions, the composition ratio of elements configuring Titanium 3AL-2.5V Alloy and carbon emission per each element may be stored, and based on the composition ratio of the elements configuring the Titanium 3AL-2.5V Alloy and the carbon emission per each element, Titanium 3AL-2.5V Alloy may be stored as emitting 8.69 kgCO2e per kg of carbon when 1 kg is manufactured.

The specification information DB 112 may store data in which carbon emissions are defined for each bicycle frame made of a predetermined material.

Figure 3:
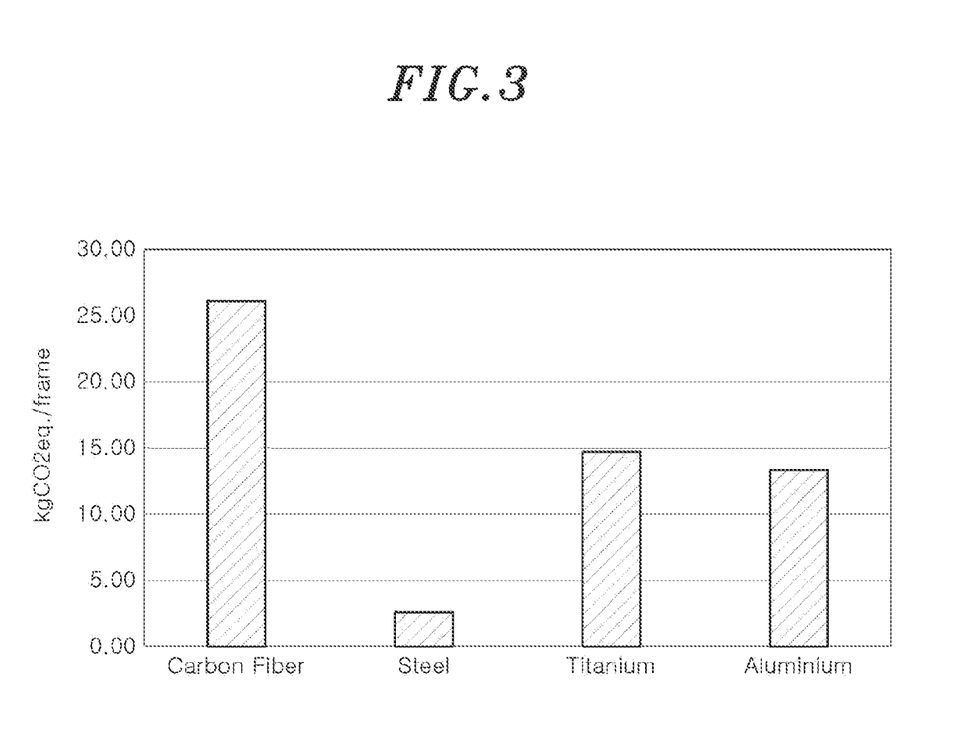
FIG. 3 is an exemplary diagram of data in which carbon emissions are defined for each bicycle frame made of a predetermined material according to an embodiment.

FIG. 3 is an exemplary diagram of data in which carbon emissions are defined for each bicycle frame made of a predetermined material according to an embodiment.

Referring to FIG. 3, the data defining carbon emissions may include carbon emissions for each frame when the materials configuring the frames of a bicycle (for example, carbon fiber, steel, titanium, aluminum, etc.) are manufactured. For example, when the frames of a bicycle is made of carbon fiber, it may be stored as emitting 26.07 kgCO2 eq./frame of carbon per frame.

The specification information DB 112 not only may store carbon emissions for each type of materials of the frame, which is the above-described example, but also may store data in which carbon emissions per frame/wheel/drive system unit is defined for each type of frame, wheel, and drive system, which are the three major parts configuring a bicycle (hereinafter referred to as "3 Zone parts").

The specification information DB 112 may store detailed information of bicycle parts. For example, the detailed information of parts includes information about the material, weight, amount of carbon emitted during manufacturing, use, manufacturer, year of production, brand of each part, category, model year, operation method, color, material, model name, size, minimum recommended height, maximum recommended height, geometry, and price.

The specification information DB 112 may store data calculated according to an embodiment to be described later on carbon emissions emitted during manufacturing of the entire bicycle or bicycle parts according to an embodiment of the present disclosure. The specification information DB 112 may classify and store the carbon emission during manufacturing of each part configuring the corresponding bicycle when the carbon emission is stored when the entire bicycle is manufactured.

The neural network DB 113 may store the learned neural network model. For example, the neural network DB 113 is learned based on an image data set for each bicycle part to which the specification information for each part of a bicycle is mapped, and when a predetermined bicycle image is inputted, the class of the part included in the bicycle image is specified (for example, frame, wheel, and drive system)

and may include a neural network model that outputs the specification information of each part.

The instruction DB 114 may store instructions capable of performing an operation of the at least one processor 120. For example, the instruction DB 114 may store computer code for performing operations corresponding to operations of the at least one processor 120 to be described later.

The at least one processor 120 may control the overall operation of the platform server 100. The at least one processor 120 may implement an inspection module 121, a neural network module 122, an image module 123, and a control module 124. The at least one processor 120 may execute the instructions stored in the memory 110 to drive the inspection module 121, the neural network module 122, the image module 123, and the control module 124.

The inspection module 121 may acquire an image of a bicycle to be analyzed. The inspection module 121 may acquire an image acquired by capturing a bicycle by interworking with an imaging device, or may acquire an image from an external device through a communication network. To this end, the platform server 100 may be connected to an imaging device or an external device through a wired/wireless communication network.

The neural network module 122 may classify bicycle parts included in an image from the image of the bicycle to be analyzed. The neural network module 122 may learn and control a neural network model used for classification of parts.

Figure 4:
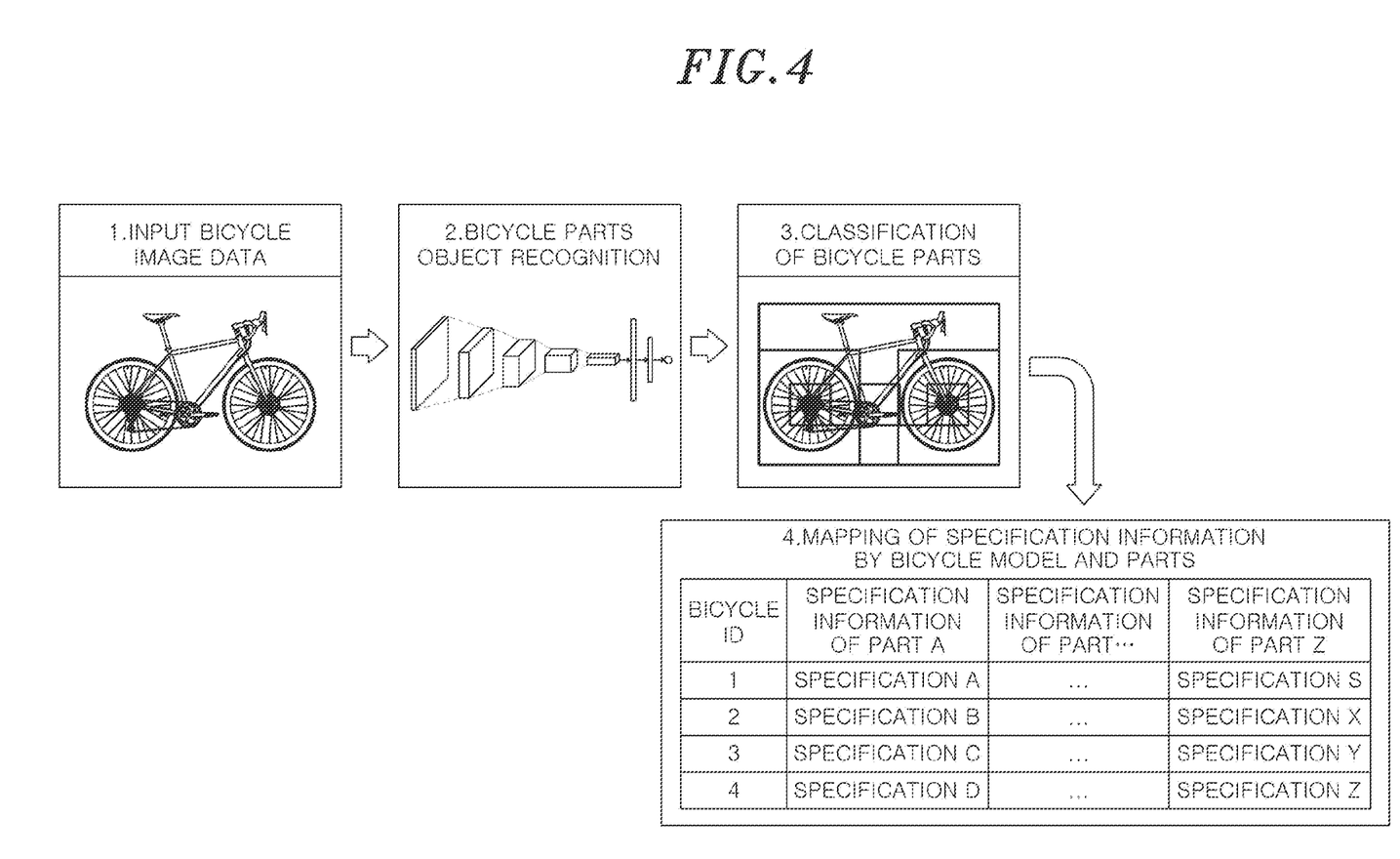
FIG. 4 is an exemplary diagram of a neural network model for classifying parts of a bicycle included in an image of a bicycle according to an embodiment.

FIG. 4 is an exemplary diagram of a neural network model for classifying parts of a bicycle included in an image of a bicycle according to an embodiment.

Referring to FIG. 4, the neural network module 122 may train a neural network model by using an image determination algorithm based on the learning image in which the position of each part configuring a bicycle is specified as a bounding box in the entire image of the bicycle, and the class specifying the parts is labeled. When the training of the neural network model is completed, in the case where a bicycle image is input to the neural network model, the feature values of the image may be extracted through convolution arithmetic, the positions of bicycle parts included in the input image may be specified based on the extracted feature values, and the specification information mapped to the specified parts may be output.

For example, the neural network model may specify and classify individual parts (for example, frame, crank, front derailleur, rear derailleur, wheel, lever, etc.) from the entire image of a bicycle, and group sets of individual parts (for example, frameset, drive system, wheelset, component, etc.) that operate in interworking with each other. The neural network module 122 may store information on parts included in the input bicycle image in the form of a set based on the classified individual parts and sets of individual parts. For example, the neural network module 122 may be specified by grouping part information included in the input bicycle image in the form of a set of elements corresponding to the frameset {fork, frame}, a set of elements corresponding to the groupset {front derailleur, rear derailleur, brake, lever, crank, cassette, chain}, a set of elements corresponding to the wheelset {tire, hub}, and a set of elements corresponding to the component {stem, seatpost, handlebar, saddle}.

The neural network module 122 may search specification information corresponding to each specified part in the specification information DB 112, and map and store the specification information corresponding to each specified part.

The image module 123 may input the pre-processed image to the neural network model by performing correction of brightness, saturation, contrast, etc. on the image acquired by the inspection module 121 so as to improve the accuracy of part determination by the neural network model.

The control module 124 may compare the parts determined from a bicycle image with the data in which the carbon emission of the specification information DB 112 is defined to determine the carbon emission according to manufacturing of a bicycle corresponding to an image, and to provide mileage to a subject related to an event based on the determined carbon emissions when the event related to the bicycle corresponding to the image occurs.

The operations performed by the aforementioned inspection module 121, the neural network module 122, the image module 123, and the control module 124 may be understood as operations performed by the at least one processor 120.

The input/output interface 130 may include a hardware interface or a software interface that allows an administrator who controls the platform server 100 to input specific information or output specific information to the administrator.

The communication interface 140 enables the platform server 100 to transmit and receive information to and from an external device (for example, an imaging device or an external device) through a communication network. To this end, the communication interface 140 may include a wireless communication module or a wired communication module.

The platform server 100 may be implemented as various types of devices capable of performing arithmetic through the at least one processor 120 and transmitting/receiving information through a network. For example, the platform server 100 may include a portable communication device, a smart phone, a computer device, a portable multimedia device, a notebook computer, a tablet PC, and the like.

Hereinafter, an embodiment of an operation performed by the platform server 100 through the aforementioned configuration will be described with reference to FIG. 5.

Figure 5:
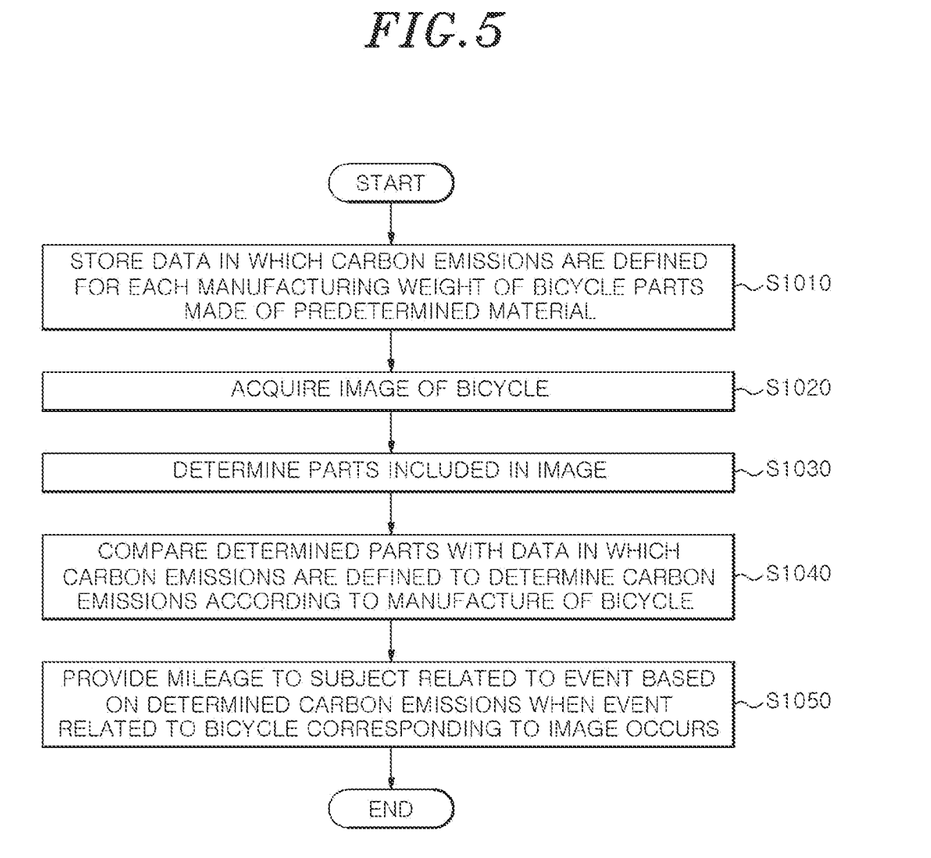
FIG. 5 is a flowchart of an operation performed by a platform server according to an embodiment.

FIG. 5 is a flowchart of an operation performed by the platform server 100 according to an embodiment.

The specification information DB 112 may store data in which carbon emissions are defined for each manufacturing weight of bicycle parts made of a predetermined material, data in which carbon emissions are defined for each frame of a bicycle made of a predetermined material, and detailed information of bicycle parts (S1010).

The inspection module 121 may acquire an image of a bicycle (S1020). For example, the image may include a view of a whole or partial bicycle, or parts of a bicycle.

The neural network module 122 may determine the parts included in an image (S1030). For example, the neural network module 122 may input the image of a bicycle to the neural network model learned based on the image data set for each bicycle part to which the specification information for each part of the bicycle is mapped, and specify the position of the parts of the bicycle to be inspected and the type of the parts. The neural network module 122 may search detailed information of the specified parts in the specification information DB 112, and map the same to the specified parts. For example, the detailed information may include information on the material of the part, the composition ratio of elements configuring the material, carbon emission per element composition, and the weight of the part.

The control module 124 may compare the information on the determined parts with the data in which the carbon emission of the specification information DB 112 is defined to determine the carbon emission according to the manufacture of a bicycle corresponding to the input image (S1040).

For example, when the type of parts of a bicycle is specified, the control module 124 may calculate the carbon emission when each part is manufactured by multiplying a carbon emission for each weight of the parts with a weight of the parts according to the data in which carbon emissions are defined. When the type of frames among the parts of the bicycle is specified, the control module 124 may calculate the carbon emission when each part is manufactured by multiplying a frame carbon emission with a weight of the parts according to the data in which carbon emissions are defined. Through this operation, the control module 124 may determine the carbon emission according to the manufacture of a bicycle by summing the carbon emissions calculated for all the determined parts.

For example, the control module 124 may determine 3 Zone parts configuring a frame, a wheel, and a drive system from the acquired image of a bicycle. The control module 124 may multiply the weight of each part in a 3 Zone determined by the carbon emission for each manufacturing weight corresponding to the materials of the 3 Zone parts (frame, wheel, and drive system) determined according to the data in which carbon emissions are defined to calculate the carbon emissions during manufacturing of the 3 Zone parts. Alternatively, the control module 124 may calculate the carbon emission during manufacturing of the 3 Zone parts by multiplying the weight of each 3 Zone part determined by the carbon emission per manufacturing frame/wheel/drive system corresponding to the materials of the 3 Zone parts (frame, wheel and drive system) determined according to the data in which carbon emissions are defined. Thereafter, the control module 124 may search information on other bicycles that are completed with the same 3 Zone parts as the 3 Zone parts determined from the acquired image among the data stored in the specification information DB 112, and may calculate the carbon emission of parts other than the 3 Zone parts of the bicycle corresponding to the acquired image based on an average of the carbon emissions emitted by the parts other than the 3 Zone parts configuring other bicycles. The control module 124 may determine the carbon emission according to the manufacture of the bicycle corresponding to the image acquired by summing the carbon emissions during manufacturing of the 3 Zone parts and the carbon emissions of other parts. In the above-described embodiment, in consideration of interworking and compatibility between bicycles with the same 3 Zone parts and based on the fact that other parts are configured of similar materials and similar weights, when it is difficult to determine the parts other than the 3 Zone parts, by determining the carbon emissions of other parts through the identification of the 3 Zone parts and the connection of information stored in the specification information DB 112, it is possible to effectively calculate carbon emissions during manufacturing of the entire bicycle.

The control module 124 may provide mileage to a subject related to an event based on the determined carbon emissions when the event related to the bicycle corresponding to the acquired image occurs (S1050). For example, the mileage may be used for services such as purchase of goods provided by the Internet service platform managed by the platform server 100.

For example, the control module 124 may disclose information on a used transaction of the bicycle corresponding to the acquired image on a used trading platform, mediate the used transaction between a seller and a buyer through the platform, and provide mileage based on carbon emissions to the subject involved in the used transaction of the bicycle. The subject involved in the used transaction of the bicycle may include an owner of the bicycle corresponding to the image and a purchaser who purchases the bicycle from the owner. The used transaction of bicycles may reduce carbon emissions from additional manufacturing or disposal of unused bicycles, and may reduce carbon emissions by encouraging the use of bicycles, thus being provided with mileage.

For example, the control module 124 may acquire the distance moved by the owner of the bicycle corresponding to the acquired image using the bicycle, and may provide the owner with mileage proportional to the moved distance. The platform server 100 may acquire the moving distance of the bicycle through a terminal owned by the owner or a position/motion sensor provided in the bicycle.

For example, the control module 124 may acquire the distance moved by the owner of the bicycle corresponding to the acquired image using the bicycle, and may provide the owner with mileage proportional to carbon emissions reduced in proportion to the moved distance using alternative means of transportation, when the moved distance corresponds to the distance replacing other means of transportation. For example, the control module 124 may be preset to determine that when the moved distance by bicycle is 5 km or more and less than 10 km, a subway is replaced, and when it is 10 km or more, a vehicle is replaced. Accordingly, when the distance moved by the owner by bicycle corresponds to 7 km, it is determined that moving 7 km by subway is replaced by a bicycle, and "carbon emission when moving 1 km by subway×7 km" is calculated to provide mileage proportional thereto. When the distance moved by the owner by bicycle corresponds to 12 km, it is determined that moving 12 km by vehicle is replaced by a bicycle, and "carbon emission when moving 1 km by vehicle×12 km" is calculated to provide mileage proportional thereto.

For example, the control module 124 may provide a platform for mediating used transactions of bicycles corresponding to the acquired image, and may generate data that aggregates carbon emissions that have been reduced as a platform provider that mediates the used transaction achieves the used transaction through the platform. In this connection, the aggregated data of the reduced carbon emission may be calculated by multiplying a carbon emission during manufacturing of a predetermined bicycle calculated according to the above-described operations S1010 to S1040 with the number of used transactions of the bicycle. Since the provision of a used trading platform of a bicycle may reduce carbon emissions from additional manufacturing or disposal of unused bicycles and reduce carbon emissions by encouraging the use of bicycles, the subject providing a platform that achieves a used transaction is also a subject involved in reducing carbon emissions. Accordingly, data related to the reduction of carbon emissions may be stored through the above-described process. The control module 124 may trade carbon credits with other subjects based on data involved in reducing carbon emissions generated according to the above-described operations, or may request additional carbon credits from a carbon credit management subject.

According to an embodiment of the present disclosure, by analyzing a bicycle owned by a user, it is possible to calculate the carbon emission required for the manufacture of the bicycle, and to reduce carbon emissions from bicycle manufacturing or disposal by linking various application services that activate the use of the bicycle. Thus, an embodiment of the present disclosure enables the objective operation of an incentive system according to the reduction of carbon emission that actively responds to government policies and the needs of the times. In addition, the data related to the amount of carbon emission reduction calculated through the embodiment may be utilized for carbon emission trading between individuals, groups, local governments, companies or countries.

Various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the at least one processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A platform server, comprising:
at least one memory configured to store instructions for performing a predetermined operation;
and at least one processor operatively connected to the at least one memory and configured to execute the instructions, wherein the at least one processor is configured to:
pre-train a neural network model by using an image determination algorithm based on an image data set, during which the neural network model learns from the image data set so that each bicycle part of a bicycle to which specification information for each bicycle part is mapped in a way that a position of each bicycle part is specified using a bounding box in an image of the bicycle, a class specifying the bicycle part is labeled, and detailed specification information including a material and weight is mapped to each bicycle part;
store defined data defining carbon emissions in a specification information database (DB),
wherein the defined data includes carbon emissions for each manufacturing weight of a plurality of predetermined materials configuring each of the bicycle parts when each of the plurality of predetermined materials is manufactured;
acquire an image of a bicycle from an owner;
determine parts included in the acquired image by:
inputting the acquired image to the neural network model,
extracting, by using the neural network model through convolution arithmetic, a plurality of feature values of the acquired image,
specifying, by using the neural network model, via identifying a plurality of specified parts of based on a plurality of positions of bicycle parts included in the acquired image presented as the plurality of feature values,
searching and mapping, by using the neural network model, detailed specification information corresponding to the plurality of specified parts in the specification information DB,
wherein the detailed specification information for each part of the plurality of specified parts comprises information on a material and weight of each specified part,
and outputting the detailed specification information mapped to the specified parts;
determine carbon emissions according to manufacturing of the bicycle corresponding to the acquired image by comparing information on the determined parts with the defined data;
and provide mileage to a subject related to an event based on the determined carbon emissions when the event related to the bicycle corresponding to the acquired image occurs,
wherein the determining carbon emissions includes:
determining 3 Zone parts of the bicycle corresponding to the acquired image configuring a frame, a wheel, and a drive system among the determined parts of the bicycle;
determining a material and weight of the determined 3 Zone parts based on the detailed specification information mapped to the specified parts;
calculating carbon emissions during manufacturing of the determined 3 Zone parts by multiplying the weight of the determined 3 Zone parts with a carbon emission for each manufacturing weight corresponding to the material of the determined 3 Zone parts according to the defined data stored in the specification information DB;

calculating carbon emissions during manufacturing parts of the bicycle corresponding to the acquired image other than the determined 3 Zone parts based on an average of carbon emissions emitted by the parts of the bicycle corresponding to the acquired image other than the determined 3 Zone parts;

and determining the carbon emissions according to manufacturing of the bicycle corresponding to the acquired image by summing the carbon emissions during manufacturing of the determined 3 Zone parts and the carbon emissions of the parts other than the determined 3 Zone parts.

2. The platform server of claim 1, wherein the at least one processor is further configured to: acquire a distance moved by the owner of the bicycle corresponding to the acquired image using the bicycle, and provide the owner with mileage proportional to carbon emissions according to the distance moved using the other means of transportation when the moved distance corresponds to a distance that replaces other means of transportation.

3. The platform server of claim 2, wherein the mileage proportional to the moved distance is proportional to a value obtained by multiplying the moved distance with carbon emissions for each moving distance when the other means of transportation is used.

4. The platform server of claim 2, wherein the at least one processor is further configured to: discriminate a type of a means of transportation replaced by the owner based on a range of the distance moved using the bicycle corresponding to the acquired image; and discriminate the carbon emissions by multiplying a carbon emission in units of a distance moved by the discriminated type of the means of transportation with the moved distance.

5. The platform server of claim 1, wherein the at least one processor is further configured to: disclose information on a used transaction of the bicycle corresponding to the acquired image to a used trading platform; and provide the mileage based on the carbon emissions to the subject involved in the used transaction of the bicycle by mediating the used transaction.

6. The platform server of claim 5, wherein the subject involved in the used transaction comprises the owner of the bicycle corresponding to the image and a purchaser who purchases the bicycle corresponding to the acquired image from the owner.

7. The platform server of claim 1, wherein the at least one processor is further configured to: mediate a used transaction of the bicycle corresponding to the acquired image; and generate data that aggregates carbon emissions that have been reduced as a platform provider that mediates the used transaction achieves the used transaction through the platform.

8. The platform server of claim 7, wherein the at least one processor is further configured to:

trade carbon credits based on reduced carbon emissions according to the aggregated data.

9. The platform server of claim 1, wherein the at least one processor is further configured to: calculate the carbon emissions during manufacturing of the parts by multiplying a carbon emission for each manufacturing weight corresponding to the material of the determined parts with a weight of the determined parts according to the detailed specification information DB; and determine the carbon emissions according to manufacturing of the bicycle corresponding to the acquired image by summing the carbon emissions calculated for all parts determined from the acquired image.

10. The platform server of claim 1, wherein the detailed specification information for each part of the plurality of specified parts include information on the material of the part, the composition ratio of elements configuring the material, and carbon emission per element composition.

11. The platform server of claim 1, wherein the at least one processor is further configured to acquire a distance moved by the owner of the bicycle corresponding to the acquired image using the bicycle, and provide mileage proportional to the moved distance to the owner.

12. A platform providing method performed by a platform server, the method comprising:

pre-training a neural network model by using an image determination algorithm based on an image data set, during which the neural network model learns from the image data set so that each bicycle part of a bicycle to which specification information for each bicycle part is mapped in a way that a position of each bicycle part is specified using a bounding box in an image of the bicycle, a class specifying the bicycle part is labeled, and detailed specification information including a material and weight is mapped to each bicycle part;

storing defined data, defining carbon emissions in a specification information database (DB), wherein the defined data includes carbon emissions for each manufacturing weight of a plurality of predetermined materials configuring the parts of the bicycle when each of the plurality of predetermined materials is manufactured;

acquiring an image of a bicycle from an owner;

determining parts included in the acquired image by:

inputting the acquired image to the neural network model, extracting, by using the neural network model through convolution arithmetic, a plurality of feature values of the acquired image, specifying, by using the neural network model, via identifying a plurality of specified parts of based on a plurality of positions of bicycle parts included in the acquired image presented as the plurality of feature values, searching and mapping, by using the neural network model, detailed specification information corresponding to the plurality of specified parts in the specification information DB, wherein the detailed specification information for each part of the plurality of specified parts comprises information on a material and weight of each specified part, and outputting the detailed specification information mapped to the specified parts;

determining carbon emissions according to manufacturing of the bicycle corresponding to the acquired image by comparing information on the determined parts with the defined data;

and providing mileage to a subject related to an event based on the determined carbon emissions when the event related to the bicycle corresponding to the acquired image occurs, wherein the determining carbon emissions includes:

determining 3 Zone parts of the bicycle corresponding to the acquired image configuring a frame, a wheel, and a drive system among the determined parts of the bicycle;

determining a material and weight of the determined 3 Zone parts based on the detailed specification information mapped to the specified parts;

calculating carbon emissions during manufacturing of the determined 3 Zone parts by multiplying the weight of the determined 3 Zone parts with a carbon emission for each manufacturing weight corresponding to the material of the determined 3 Zone parts according to the defined data stored in the specification information DB;

calculating carbon emissions during manufacturing parts of the bicycle corresponding to the acquired image other than the determined 3 Zone parts based on an average of carbon emissions emitted by the parts of the bicycle other than the determined 3 Zone parts;

and determining the carbon emissions according to manufacturing of the bicycle corresponding to the acquired image by summing the carbon emissions during manufacturing of the determined 3 Zone parts and the carbon emissions of the parts other than the determined 3 Zone parts.

13. The platform providing method of claim 12, wherein detailed specification information for each part of the plurality of specified parts includes information on the material of the part, the composition ratio of elements configuring the material, and carbon emission per element composition.

14. The platform providing method of claim 12, wherein the providing of the mileage comprises: disclosing information on a used transaction of the bicycle corresponding to the acquired image to a used trading platform; and providing the mileage based on the carbon emissions to the subject involved in the used transaction of the bicycle by mediating the used transaction.

15. The platform providing method of claim 12, wherein the providing of the mileage comprises acquiring a distance moved by the owner of the bicycle corresponding to the acquired image using the bicycle, and providing mileage proportional to the moved distance to the owner.

16. A non-transitory computer-readable storage medium including computer executable instructions, wherein the instructions, when executed by at least one a processor, cause the at least one processor to perform a platform providing method, the method comprising:

pre-training a neural network model by using an image determination algorithm based on an image data set, during which the neural network model learns from the image data set so that each bicycle part of a bicycle to which specification information for each bicycle part is mapped in a way that a position of the bicycle part is specified as a bounding box in an image of the bicycle, a class specifying the bicycle part is labeled and detailed specification information including a material and weight is mapped to each bicycle part;

storing defined data, for the bicycle, defining carbon emissions in a specification information database (DB), wherein the defined data includes carbon emissions for each manufacturing weight of a plurality of predetermined materials configuring each of the bicycle parts when each of the plurality of predetermined materials is manufactured;

acquiring an image of a bicycle from an owner;

determining parts included in the acquired image by:

inputting the acquired image to the neural network model, extracting, by using the neural network model through convolution arithmetic, a plurality of feature values of the acquired image, specifying, by using the neural network model, via identifying a plurality of specified parts of based on a plurality of positions of bicycle parts included in the acquired image presented as the plurality of feature values, searching and mapping, by using the neural network model, detailed specification information corresponding to the plurality of specified parts in the specification information DB, wherein the detailed specification information for each part of the plurality of specified parts comprises information on a material and weight of the part, and outputting the detailed specification information mapped to the specified parts;

determining carbon emissions according to manufacturing of the bicycle corresponding to the acquired image by comparing information on the determined parts with the defined data;

and providing mileage to a subject related to an event based on the determined carbon emissions when the event related to the bicycle corresponding to the acquired image occurs, wherein the determining carbon emissions includes:

determining 3 Zone parts of the bicycle corresponding to the acquired image configuring a frame, a wheel, and a drive system among the determined parts of the bicycle;

determining a material and weight of the determined 3 Zone parts based on the detailed specification information mapped to the specified parts;

calculating carbon emissions during manufacturing of the determined 3 Zone parts by multiplying the weight of the determined 3 Zone parts with a carbon emission for each manufacturing weight corresponding to the material of the determined 3 Zone parts according to the defined data stored in the specification information DB;

calculating carbon emissions during manufacturing parts of the bicycle corresponding to the acquired image other than the determined 3 Zone parts based on an average of carbon emissions emitted by the parts of the bicycle corresponding to the acquired image other than the determined 3 Zone parts;

and determining the carbon emissions according to manufacturing of the bicycle corresponding to the acquired image by summing the carbon emissions during manufacturing of the determined 3 Zone parts and the carbon emissions of the parts other than the determined 3 Zone parts.

* * * * *